United States Patent [19]
Tanijiri et al.

[11] Patent Number: 6,144,476
[45] Date of Patent: Nov. 7, 2000

[54] IMAGE DISPLAY DEVICE

[75] Inventors: Yasushi Tanijiri, Osakasayama; Takatoshi Ishikawa, Osaka; Kenji Ishibashi, Izumi, all of Japan

[73] Assignee: Minolta Co., Ltd., Osaka, Japan

[21] Appl. No.: 09/179,439

[22] Filed: Oct. 27, 1998

[30]     Foreign Application Priority Data

Oct. 30, 1997  [JP]  Japan .................................. 9-298455

[51] Int. Cl.$^7$ .................................................. G02B 26/08
[52] U.S. Cl. .......................... 359/201; 359/630; 345/8; 353/28; 353/48
[58] Field of Search .................................... 359/201, 202, 359/212, 221, 223, 226, 290, 291, 298, 630, 633; 345/7, 8, 9; 353/28, 48

[56]             References Cited

U.S. PATENT DOCUMENTS

| | | | |
|---|---|---|---|
| 4,874,215 | 10/1989 | Montagu | 310/36 |
| 5,285,307 | 2/1994 | Pekar et al. | 359/201 |
| 5,557,444 | 9/1996 | Melville et al. | 359/199 |
| 5,751,465 | 5/1998 | Melville et al. | 359/199 |
| 5,784,148 | 7/1998 | Heacock | 351/221 |
| 5,993,000 | 11/1999 | Kobayashi et al. | 351/211 |

FOREIGN PATENT DOCUMENTS 5-100175   4/1993   Japan .

*Primary Examiner*—Darren Schuberg
*Attorney, Agent, or Firm*—Burns, Doane, Swecker & Mathis, LLP

[57]                ABSTRACT

An image display device having a scanning device for scanning light from a light source and for projecting a virtual image on a pupil of a viewer. The scanning device has a first mirror and a second mirror that scan the light in a same direction.

25 Claims, 5 Drawing Sheets

FIG. 1A
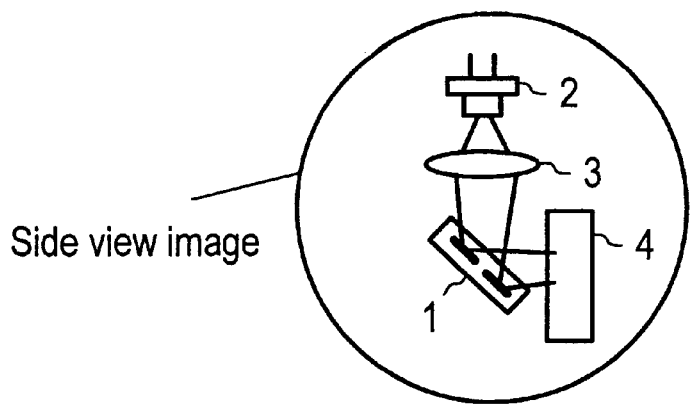
Side view image
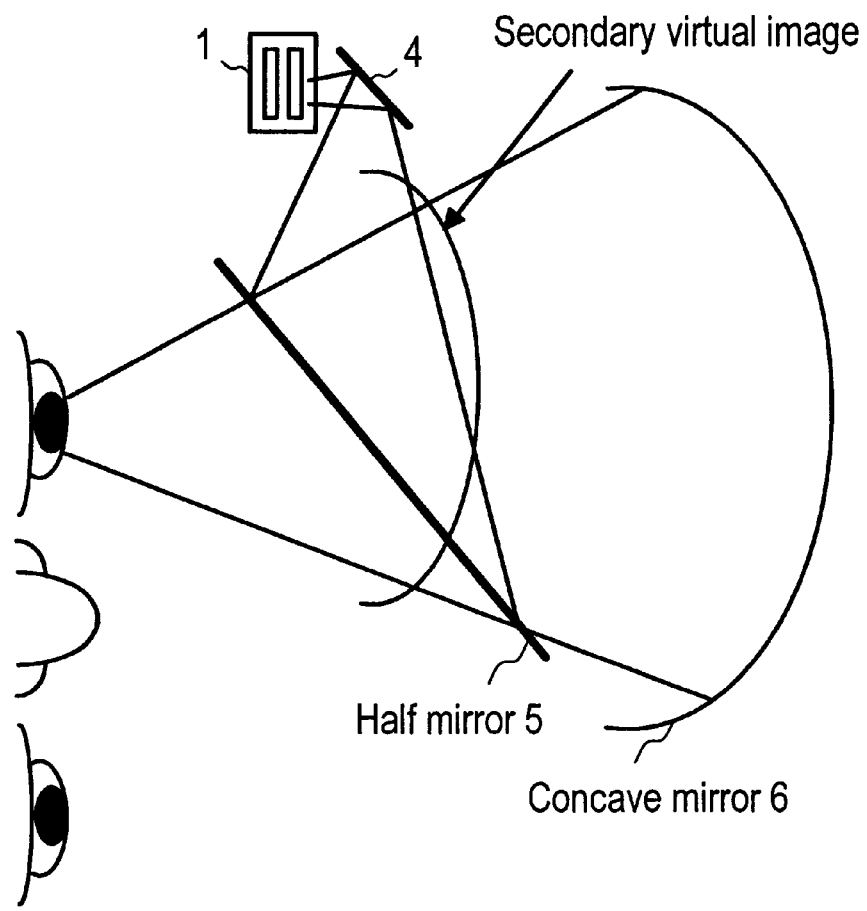
Secondary virtual image
Half mirror 5
Concave mirror 6
FIG. 1B

IMAGE DISPLAY DEVICE

BACKGROUND OF THE INVENTION

1. Field of the Invention

The present invention pertains to an image display device that scans light from a light source by means of a scanning device, and performs image display.

2. Description of the Related Art

One example of a conventional scanning device includes sympathetically vibrating mirrors, such as that disclosed in U.S. Pat. No. 5,557,444 (conventional example 1). In these sympathetically vibrating mirrors, the vibrating members are made lightweight in order to allow image display, i.e., in order to achieve a high frequency.

Another example of a conventional optical scanning device is an optical scanner disclosed in Japanese Laid-Open Patent Application Hei 5-100175 (conventional example 2). In this optical scanner, a reflective mirror is located at one end of an elastic deforming member and the linear vibration of a piezo electric element is input to a vibration input member at the other end. The reflective mirror is caused to rotationally vibrate via sympathetic vibrations with the bending and twisting vibrations of the elastic deforming member in order to deflect the light.

However, in the conventional example 1, the reflective surface is made small in order to make the mirror unit lightweight, which leads to the problem that the exit pupil is small and the position of the eye must be precisely controlled. Further, in order to achieve a higher frequency in the conventional example 1, the mirror must become even smaller, which leads to the problem that light having a numerical aperture necessary for the viewer's pupil to resolve the image cannot be provided.

Where the optical scanner of the conventional example 2 is used as a scanning device for an image display, the problems arises that, if a construction is used in which the necessary beam diameter is provided to the viewer's pupil, the size of the mirror must be increased. Because the inertial moment of the reflective mirror increases and the resonance frequency and the amplitude cannot be increased, precise and detailed images cannot be provided in a large field of view.

SUMMARY OF THE INVENTION

The present invention was developed in consideration of these problems. Its object is to provide an image display device that has a large exit pupil so that the position of the eye may be determined more freely and that has a scanning device that provides light having a numerical aperture necessary for the viewer's pupil to resolve the image and that is capable of a large amplitude at a high frequency.

In order to attain this object, an image display device according to one aspect of the present invention includes a first scanning device that scans the light from the light source in a first direction and that projects a secondary virtual image on the pupil of the viewer. The first scanning device has multiple reflective mirrors that rotate by rotationally vibrating or by rotating about an axis in one direction, and that are (i) located such that their rotational axes are essentially parallel to one another and (ii) driven synchronously.

In the construction described above, the first scanning device has multiple reflective mirrors. Therefore, even if each reflective mirror is small, a large overall numerical aperture may nonetheless be obtained. By making the reflective mirrors small, the amplitude and number of vibrations of their rotation or rotational vibration may increase. The light is scanned in the first scanning direction due to the rotation or rotational vibration of the reflective mirrors.

According to another aspect of the present invention, the image display device is equipped with a first scanning device that scans the light from the light source in a first direction and a second scanning device that scans it in a second direction, and that projects a secondary virtual image on the pupil of the viewer, wherein the first scanning device has multiple reflective mirrors that rotate by rotationally vibrating or by rotating about an axis in one direction, and are (i) located such that their rotational center axes are essentially parallel to one another and (ii) driven synchronously.

In the construction described above, the image display device has two scanning device such that the light from the light source will be scanned in two directions. In this case, the first scanning direction (horizontal direction) is deemed the main scanning direction and the second scanning direction (vertical direction) is deemed the secondary scanning direction, for example. The construction is such that the first scanning device that scans the light in the first scanning direction has multiple reflective mirrors. The same effect as the first scanning means is obtained from this first scanning means. Therefore, the scanning speed of the first scanning device can be made fast, which increases the speed of the main scanning. Consequently, two-dimensional images may be scanned at a high speed.

According to a further aspect of the present invention, the configuration of each of the reflective mirrors of the first scanning device is set such that light that satisfies the Rayleigh criterion to resolve the pixels will be provided to the viewer's pupil.

In the construction described above, light that satisfies the Rayleigh criterion is provided to the viewer's pupil. Therefore, the viewer can distinguish the pixels of the displayed image. Specifically, whether or not the light provided to the viewer's pupil satisfies the Rayleigh criterion is determined by the beam diameter of the incident light. In this image display device, the beam diameter is controlled by means of the configuration of the reflective mirrors of the first scanning device.

The first scanning device can also have reflective mirrors each having a reflective surface with vertically long rectangular configuration in which the rotational center axis runs along its length, and the width of each exit pupil on the viewers pupil of the light reflected by the multiple reflective mirrors is approximately 0.8 mm or larger.

In the construction described above, the reflective surface of each reflective mirror of the first scanning device has a vertically long rectangular configuration with the rotational center axis running along its length. In this case, the configuration of the exit pupil of the light provided to the viewer's pupil from the reflective mirrors also assumes a vertically long rectangular shape. In this device, the construction is such that the shorter side (width) of the exit pupil having a rectangular shape is approximately 0.8 mm or larger, such that the Rayleigh criterion is satisfied. When this condition is present, the Rayleigh criterion is naturally satisfied. Therefore, where the exit pupil from one reflective mirror strikes the viewer's pupil in its entirety, the viewer can distinguish the pixels of the displayed image with high resolution. The reflective surface of each reflective mirror of the first scanning device can also have a vertically long rectangular configuration in which the rotational center axis runs along its length, and the distance between the exit pupils on the viewer's pupil of the light reflected by the multiple reflective mirrors is smaller than the diameter of the viewer's pupil.

In the construction described above, the light provided to the viewer's pupil from the multiple reflective mirrors will form multiple exit pupils each having a long rectangular configuration. By having the distance between these exit pupils be smaller than the diameter of the viewer's pupil, the viewer's pupil never becomes positioned in the space between exit pupils.

In accordance with another aspect of the present invention, the distance between the exit pupils on the viewer's pupil of the light reflected by the multiple reflective mirrors is approximately 3 mm or smaller.

Normally, the diameter of a human pupil is around 3 mm. Therefore, by having the distance between exit pupils be specifically less than approximately 3 mm, the possibility that the viewer's pupil will become positioned in the space between the exit pupils becomes very small. Even if it is positioned in such a space, the viewer will enlarge the pupil and therefore an exit pupil will strike the viewer's pupil. In addition, in a construction in which the distance between exit pupils is less than approximately 3 mm, the reflective mirrors need not be arranged closely together, and may instead be arranged such that there is a small space between them, which is preferable in terms of cost and ease of driving. It is preferred that the distance between exit pupils be 1 mm or larger. By having this construction, the light reflected by each reflective mirror does not interfere with that from another mirror.

In accordance with yet a further aspect of the present invention an image display device includes a scanning device for scanning light from a light source and for projecting a virtual image on a pupil of a viewer. The scanning device includes a first mirror and a second mirror that scan the light in the same direction.

In accordance with a further aspect of the present invention a head mounted display unit for projecting a virtual image on a pupil of a viewer includes a scanning device having a first rotatable mirror for scanning light in a first direction and a second rotatable mirror for scanning light in the first direction.

In accordance with another aspect of the present invention an image display device projects a virtual image on a pupil of a viewer. The image display device includes a first mirror and that is rotatable about a first rotation axis, and a second mirror that is rotatable about a second rotation axis. The first rotation axis is spaced from the second rotation axis. The first rotation axis and said second rotation axis are substantially located in a common plane. A first device rotates the first mirror, and a second device rotates the second mirror. A first phase detector detects a phase of the first mirror, and a second phase detector detects a phase of the second mirror. A controller controls the first device and the second device to rotate the first mirror and the second mirror synchronously based on the phases detected by the first and second phase detectors.

BRIEF DESCRIPTION OF THE DRAWINGS

FIG. 1A is a simplified plan and side view of the optical system of the image display device pertaining to the embodiments.

FIG. 1B is a simplified plan and top view of the optical system of the image display device pertaining to the embodiments.

DETAILED DESCRIPTION OF THE PREFERRED EMBODIMENTS

Figure 2:
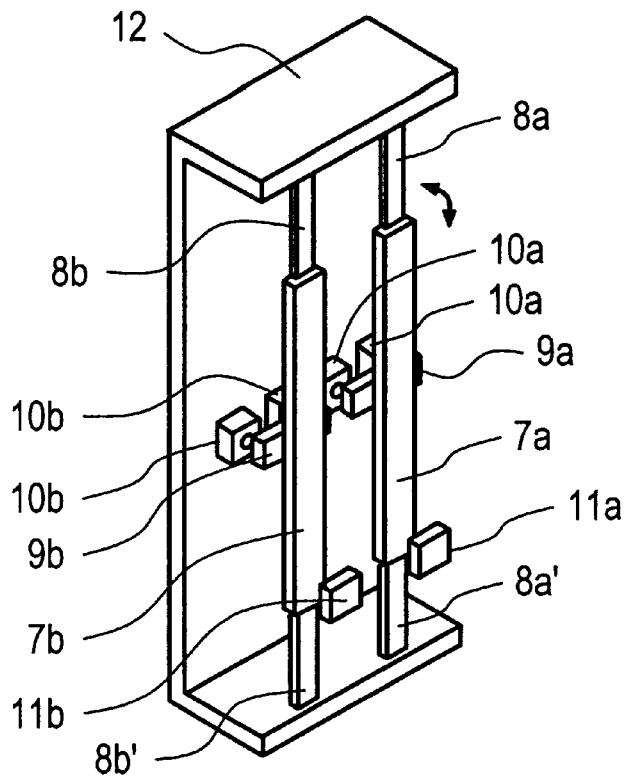
FIG. 2 is a drawing showing the construction of the main scanning device of the first embodiment.

FIGS. 1A and 1B show simplified plan views of the optical system of an image display device according to one embodiment of the present invention. This image display device is a head mounted display (HMD) whose display unit is mounted on the head. As shown in FIG. 1A, seen from the side, the light emitted from a laser light source 2 is modulated based on an image signal, and is converged by a condenser lens 3 and strikes a main scanning device 1. The main scanning device 1 scans the incident light in a horizontal direction.

A secondary scanning device 4 scans the light from the main scanning device 1 in a vertical direction. A half-mirror 5 reflects the light from the secondary scanning device 4 to a concave mirror 6. The half-mirror 5 also lets through the light from the concave mirror 6 to provide it to the viewer's pupil. The concave mirror 6 projects a virtual image to the viewer's pupil. The main scanning device 1 is located at a position at which it is essentially conjugate with the position of the viewer's pupil via the concave mirror 6.

FIG. 2 shows the construction of a first embodiment of the main scanning device 1. The main scanning device 1 includes rectangular reflective mirrors 7a and 7b that each have a width of 1 mm and a length of 10 mm. Pairs of elastic deforming members 8a, 8a' and 8b, 8b' are attached to the reflective mirrors 7a, 7b. The main scanning device 1 also includes a base 12, magnets 9a, 9b, coils 10a, 10b, and phase detectors 11a, 11b.

Since the two reflective mirrors 7a, 7b are constructed identically, the construction of the reflective mirror 7a will only be explained. The reflective mirror 7a is fixed on either end to one end of each of the two elastic deforming members 8a and 8a' (which may be alternatively constructed as a single unit). The other end of the elastic deforming members 8a, 8a' (the end not fixed to the reflective mirror 7a) is fixed to the base 12.

The magnet 9a is fixed to the reflective mirror 7a, so that the reflective mirror 7a becomes magnetized when an electric current is supplied to the coil 10a, which is fixed to the base 12. The coil 10a and the magnet 9a define a drive device that supplies vibrations having a resonant frequency to the system supported by the pair of elastic deforming members 8a, 8a'. As a result, the elastic deforming members 8a, 8a' undergo torsional vibration, and the reflective mirror 7a rotationally vibrates or rotationally oscillates about an axis defined by the deforming members 8a 8a'. Thus, the mirror 7a rotates about a rotation axis.

A phase detector 11a, such as a photoreflector, detects the vibration phase of the reflective mirror 7a and controls the drive device via a phase control device (not illustrated). The elastic deforming members 8a, 8a', 8b, 8b' are arranged such that the rotational center axes of the two reflective mirrors 7a, 7b are essentially parallel to each other, with a space between the mirrors of approximately 2 mm. The rotational axis of the mirrors 7a, 7b are also located along a common plane. The mirrors 7a, 7b scan light in the same direction. That is, the first mirror 7a scans light in one direction, and the second mirror 7b scans light in the same direction.

In this embodiment, the drive device includes the coils 10a, 10b and the magnets 9a and 9b that supply electromagnetic force, but the drive device is not limited to this construction. For example, piezoelectric elements or an extremely magnetorestrictive material may be used instead, or a construction may be used in which magnetic fields are obtained by magnetizing the mirrors or using coils instead of using magnets.

Figure 3:
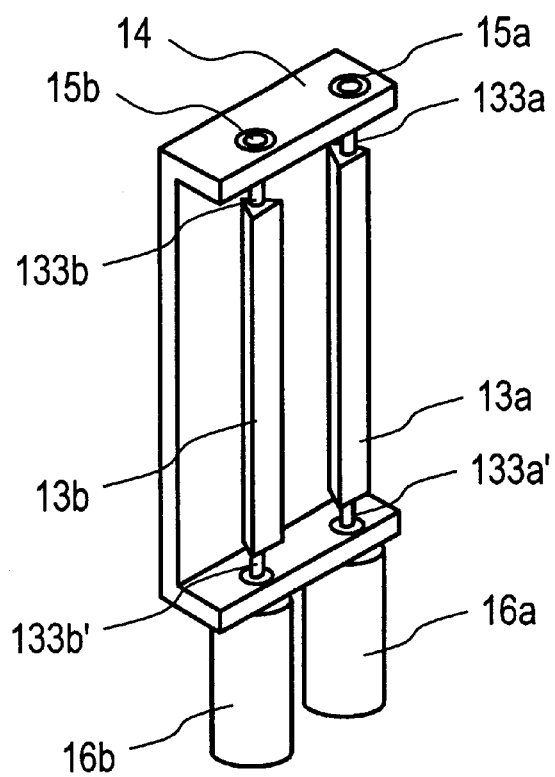
FIG. 3 is a drawing showing the construction of the main scanning device of the second embodiment.

FIG. 3 illustrates a second embodiment of the main scanning device. The main scanning device illustrated in FIG. 3 includes polygon mirrors 13a, 13b having shafts 133a, 133a' and 133b, 133b' that are constructed as a single unit with their respective polygon mirror. The polygon mirrors 13a, 13b also reflect light in the same direction. A pair of bearings 15a, 15b are located on a base 14, and position control motors 16a, 16b (drive device) control the rotation of the mirrors 13a, 13b. Since the two polygon mirrors 13a, 13b are constructed identically, only the construction of the polygon mirror 13a will be explained.

The polygon mirror 13a has three reflective surfaces, each having a width of 1 mm and a length of 10 mm, and one shaft end 133a is rotatably supported by the bearing 15a while the other shaft end 133a' is connected to the position control motor 16a. As the motor 16a rotates, the polygon mirror 13a rotates as well.

A phase detector (not shown) is constructed in the motor 16a and detects the movement of the motor 16a. The result of the detection is supplied to a phase control device (not shown). The rotational position of the polygon mirror 16a is controlled by this phase control device by controlling the motor 16a. The phase control device synchronously controls the two motors 16a, 16b.

The two polygon mirrors 13a, 13b are constructed and arranged such that their rotational center axes are essentially parallel. The distance between the edge of each mirror when the mirrors are located in a common plane is approximately 2 mm. Thus, the mirrors are spaced from each other by approximately 2 mm.

Figure 4:
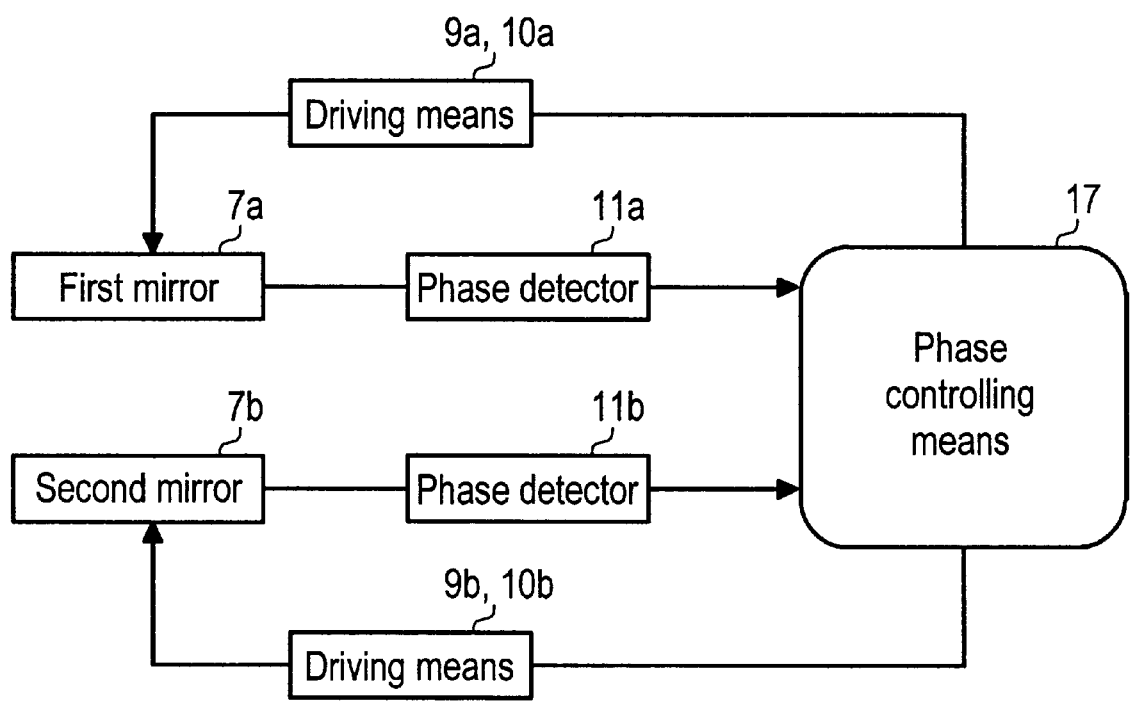
FIG. 4 is a block diagram of the drive control in the main scanning device of the first embodiment.

FIG. 4 shows a block diagram regarding the drive control for the two reflective mirrors 7a, 7b of the main scanning device 1 pertaining to the first embodiment of the device. The two reflective mirrors 7a, 7b are the first and second mirrors, respectively. The vibration phases of the reflective mirrors 7a, 7b are detected by the phase detecting devices 11a, 11b. Based on the results of this detection, the phase controlling device 17 controls the two drive devices 9a, 10a and 9b, 10b such that the vibrations of the two reflective mirrors 7a and 7b will be synchronized. The block diagram regarding the drive control for the scanning device pertaining to the second embodiment shown in FIG. 3 would be the same as that illustrated in FIG. 4.

The exit pupil diameter (light beam diameter) that is necessary for a human pupil to resolve images will now be explained. It is believed that the resolution of the human pupil is generally around one minute. Therefore, it is preferred, in optical equipment such as binoculars and telescopes, to set the resolution of the lens diameter to one minute or smaller. However, in a device such as an image display device where the image on the display device is presented through enlargement by means of an eyepiece optical system, due to the low pixel density of the display device, the angle of the light that strikes the pupil has a width of several minutes, and therefore an optical system resolution of several minutes is sufficient. The required resolution will now be sought from the relationship between the display pixels and the display angle of view, and the required light beam diameter will be sought from the Rayleigh criterion below.

For example, where a VGA screen (640×480) is to be viewed at a horizontal angle of view of 30 degrees, the resolution required to distinguish the pixels is 2.8 minutes (30×60/640=2.8). When the frequency is A and the light beam diameter is D, the angular resolution is expressed as 1.22 $\lambda$/D from the Rayleigh criterion. Consequently, when the frequency ($\lambda$) is 550 nm, the required light beam diameter (D) is 0.823 mm. This number is obtained using the equation 1 set forth below.

$$D=1.22\times550\times10^{-6}/(2.8/60)/(\lambda/180)=0.823$$

Therefore, in order for the viewer to resolve the image in the image display device of this embodiment, it is necessary to provide a light beam having a diameter of 0.8 mm or larger to the viewer's pupil.

FIG. 5 shows the exit pupils on the viewer's pupil using the main scanning device 1 of the image display device pertaining to this embodiment. Since the position of the exit pupils on the viewer's pupil varies when the viewer's pupil moves or due to the differences in the location of the pupil depending on the viewer, different examples are shown in FIGS. 5(a), 5(c), 5(d) and 5(f). FIG. 5(b) shows the same situation as that shown in FIG. 5(a) but seen from the side, while FIG. 5(e) shows the viewer's pupil enlargement when the observed image is dark, as in the case of FIG. 5(d).

Since this embodiment has a construction in which the main scanning device 1 has reflective surfaces each having a width of 1 mm and a length of 10 mm and the space between the two reflective surfaces is 2 mm, the exit pupils that are at the conjugate position with these reflective surfaces also comprise two rectangular exit pupils 19a and 19b, each having a width of 1 mm and a length of 10 mm, and the space between the two rectangular exit pupils 19a and 19b is 2 mm.

Figure 5A:
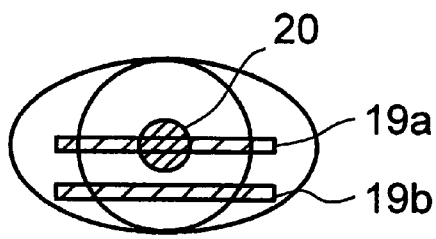
FIGS. 5(a)–5(e) are drawings showing the exit pupils on the viewer's pupil using the image display device pertaining to these embodiments.

In FIG. 5(a), the width of one exit pupil 19a is positioned completely inside the pupil 20. A human pupil has a minimum diameter of approximately 2 mm, and in this case, a light beam that is 1 mm in the vertical direction (the width of the exit pupil 19a) and 2 mm or longer in the horizontal direction is striking the pupil 20. Therefore, since the Rayleigh criterion is satisfied in both directions, a light beam sufficient for the viewer to resolve the image is striking the pupil.

Figure 5B:
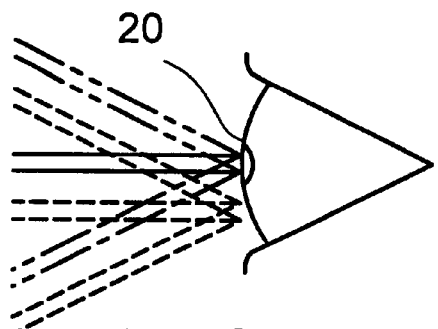

FIG. 5(b) is a side view of the situation shown in FIG. 5(a). It shows the manner in which the light corresponding to the top and bottom image areas as well as the center image area is led to the pupil.

Figure 5C:
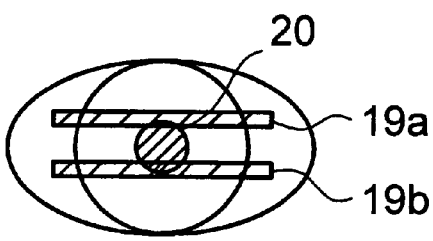

In FIG. 5(c), parts of the two exit pupils 19a and 19b are striking the pupil 20. Although the Rayleigh criterion is satisfied in the horizontal direction, it is not met in the vertical direction. However, because the image changes and the viewer's pupil 20 rarely stays in any one position, this practically does not create any problems. It is preferred, however, to make the distance between the exit pupils narrower for observation of higher resolution images, so that light that satisfies the Rayleigh criterion strikes the viewer's pupil.

Figure 5D:
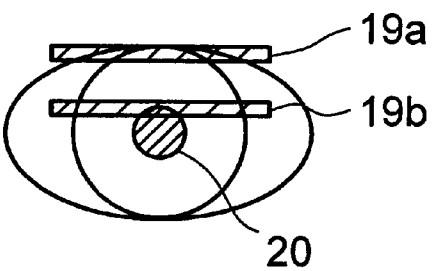
Figure 5E:
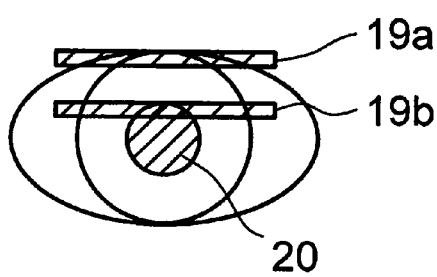

In FIG. 5(d), a part of one exit pupil 19b is striking the pupil 20. Although it does not satisfy the Rayleigh criterion in the vertical direction, it does satisfy it in the horizontal direction. Therefore, it is possible for the viewer to resolve the image. In this case, however, since the amount of incident light is small and the viewer perceives the image to be dark, the viewer does not continue his observation in the state of FIG. 5(d), but rather the pupil 20 enlarges as shown in FIG. 5(e), whereupon image observation is continued. The Rayleigh criterion is satisfied in both directions in this state, and therefore the viewer can view higher resolution images.

Figure 5F:
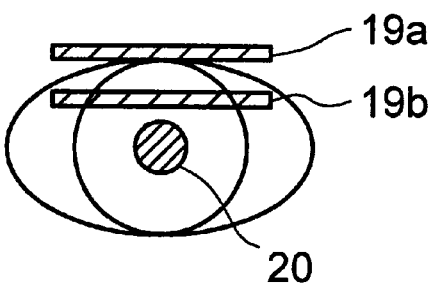

In FIG. 5(f), the light does not strike the pupil 20 and the viewer cannot resolve the image. In this case, the viewer changes the position of the pupil 20 or the mounting position of the HMD itself in order for the exit pupils 19a and 19b to strike the pupil 20. On the other hand, it is also acceptable if position control is not performed by the viewer, and is instead handled by the device. For example, the device may have a construction in which it has a control function to control the position of the exit pupils, or has three or more reflective surfaces in the main scanning device 1, so that the exit pupil striking range will be increased.

As described above, the exit pupils of this embodiment comprise two rectangular exit pupils 19a and 19b each having a width of 1 mm and a length of 10 mm, and the space between the two rectangular exit pupils 19a and 19b is 2 mm, and the device has a construction in which light that satisfies the Rayleigh criterion strikes the pupil so that the viewer can resolve the pixels. In a conventional image display device, the construction is such that the light strikes the entire pupil, and therefore in this embodiment, the construction is such that the emitted light will have a higher intensity than that in regular devices so that light having the same level of brightness as in conventional devices will strike the pupil when light having a diameter sufficient for image resolution by the viewer strikes the viewer's pupil.

Using the device of this embodiment, assuming image resolution is possible if the exit pupil is 0.5 mm or larger in the vertical direction, and where the human pupil is 3 mm in diameter (more or less the normal diameter), this is equivalent to having an exit pupil having a vertical length of 9 mm in a conventional device. This will be explained with reference to FIG. 6.

Figure 6:
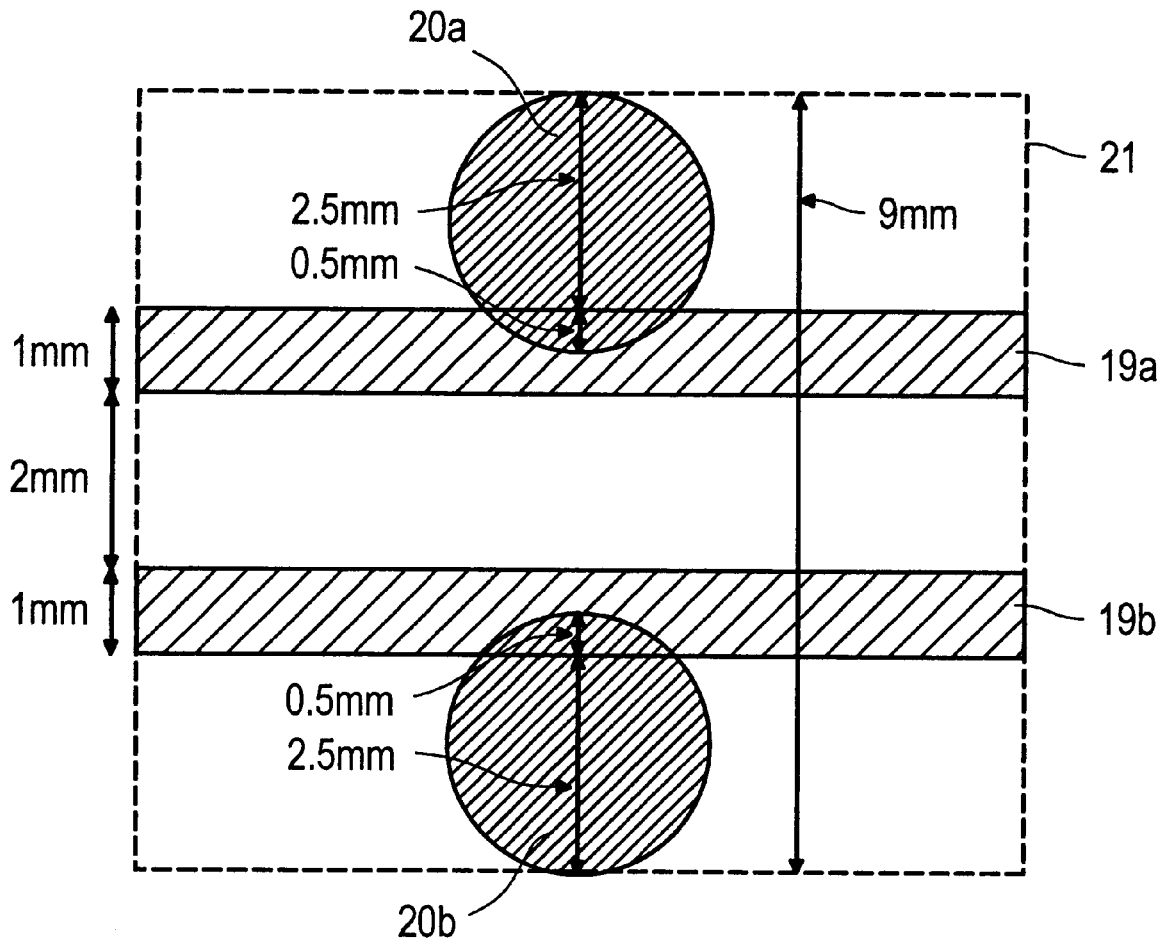
FIG. 6 is a drawing in which the exit pupils obtained by means of the image display device of these embodiments are converted in terms of exit pupils obtained by means of a conventional image display device.

FIG. 6 illustrates exit pupils 19a and 19b when the image display device of this embodiment is used. The upper limit at which the viewer's pupil can perform image resolution is 20a and the lower limit is 20b for these exit pupils. Therefore, so long as the exit pupil is within the vertical 9 mm range, image resolution is possible. In other words, this is equivalent to having an exit pupil as large as the area 21 indicated by dotted lines in a conventional device.

As described above, the construction of this embodiment is such that the vertical length of each rectangular exit pupil is 1 mm, but the implementation of this invention is not limited to this number, though it is preferred that the lengths in both directions be 0.8 mm or larger so that the Rayleigh criterion will be met. Furthermore, although the construction is such that the space between the two rectangles is 2 mm, the implementation of this invention is not limited to this number. However, since a human pupil is usually around 3 mm in diameter, it is preferred that the space be approximately 3 mm or less so that the pupil will not come to be positioned in the space. In order to prevent the light of the two exit pupils from interfering with each other because they are too close together, it is preferred that the space be 1 mm or larger.

To prevent the light of the two exit pupils from interfering with each other, it is acceptable to adopt a construction in which the light that strikes one reflective surface passes through a ¼ wavelength plate. In this case, there is no lower limit to the distance between them. It would be acceptable even if there were no gap between the two exit pupils. However, where the distance between them is too small, the range that corresponds to the exit pupils of a conventional device becomes small as well. It is therefore preferred that the space be 1 mm or larger, as described above. In addition, when the two exit pupils strike the viewer's pupil at the same time (see FIG. 5(c)), the use of a ¼ wavelength plate has the effect of preventing the two light beams that form images on the retina from interfering with each other.

Using this invention, it is possible to provide a device with which highly precise images can be observed in a large field of view because light having a numerical aperture necessary for the viewer's pupil to perform image resolution can be scanned at a high frequency and a high amplitude.

In addition, since the mirrors of the scanning device have a relatively small inertial moment, the scanning device is not easily affected by movement, and stable image display is possible. Furthermore, since the device may be constructed to have virtually large exit pupils, the limitation to the position of the viewer's pupil is reduced.

What is claimed is:

1. An image display device comprising:
   a scanning device for scanning light from a light source and for projecting light on a pupil of a viewer for viewing a virtual image, said scanning device having a first mirror that scans a first light in a first direction and a second mirror that scans a second light in said first direction, wherein said first light and said second light are separate and distinct.

2. The image display device according to claim 1, wherein said first mirror is rotatable about a first rotation axis and said second mirror is rotatable about a second rotation axis.

3. The image display device of claim 2, wherein said first rotation axis is different from said second rotation axis and is substantially parallel with said second rotation axis.

4. The image display device of claim 2, wherein said first rotation axis and said second rotation axis are in a same plane.

5. The image display device of claim 1, wherein said scanning device includes a first device for rotating said first mirror and a second device for rotating said second mirror.

6. The image display device of claim 5, wherein the first device for rotating said first mirror causes said first mirror to rotationally vibrate.

7. The image display device of claim 5, further comprising means for rotating said first mirror and said second mirror synchronously.

8. The image display device according to claim 1, wherein said first mirror is spaced from said second mirror.

9. The image display device of claim 1, wherein said scanning device is a first scanning device and said scanning direction is a first scanning direction, and wherein said image display device further comprises a second scanning device for scanning the first light and the second light and for projecting the first light and the second light on a pupil of a viewer for viewing a virtual image, said second scanning device having two rotatable mirrors that scan the first light and the second light in a second scanning direction that is different from the first scanning direction.

10. The image display device of claim 1, wherein said first mirror and said second mirror are arranged and configured such that the first light and the second light provided to the pupil of the viewer for viewing the virtual image satisfy a Rayleigh criterion.

11. The image display device of claim 1, wherein the first mirror and the second mirror each include a rectangular reflective surface having a width of at least 0.8 mm.

12. The image display device of claim 1, wherein said first mirror and said second mirror are arranged and configured such that the distance between an exit pupil of the first mirror and an exit pupil of the second mirror is shorter than approximately 3 mm.

13. A head mounted display device for projecting light on a pupil of a viewer for viewing a virtual image, comprising:

a scanning device having a first mirror for scanning a first light in a first direction and a second mirror for scanning a second light in said first direction, wherein said first light and said second light are separate and distinct.

14. The head mounted display device of claim 13, wherein said first mirror is spaced from said second mirror.

15. The head mounted display device of claim 13, wherein said first mirror is rotatable about a first rotation axis, and said second mirror is rotatable about a second rotation axis.

16. The head mounted display device of claim 15, wherein said first rotation axis and said second rotation axis are located in a same plane.

17. The head mounted display device of claim 13, wherein said scanning device is a first scanning device, and wherein said head mounted display device further comprises a second scanning device having two rotatable mirrors for scanning the first light and the second light in a second direction, said second direction being different from said first direction.

18. An image display device for projecting light on a pupil of a viewer for viewing a virtual image, comprising:

a first mirror that is rotatable about a first rotation axis and that scans a first light;

a second mirror that is rotatable about a second rotation axis and that scans a second light that is separate and distinct from said first light, said first rotation axis being different from said second rotation axis, said first rotation axis and said second rotation axis being substantially located in a common plane;

a first device for rotating said first mirror;

a second device for rotating said second mirror;

a first phase detector for detecting a phase of the first mirror;

a second phase detector for detecting a phase of the second mirror; and a controller for controlling said first device and said second device to rotate said first mirror and said second mirror synchronously based on the phases detected by the first and second phase detectors.

19. The image display device of claim 18, wherein said first mirror is spaced from said second mirror by at least 2 mm.

20. The image display device of claim 18, wherein said first mirror and said second mirror are rectangular.

21. The image display device of claim 18, wherein said first mirror and said second mirror each have a width of at least approximately 8 mm.

22. The image display apparatus of claim 18 wherein said first mirror and said second mirror are polygonal.

23. The image display device of claim 18, wherein said first rotation axis is parallel with said second rotation axis.

24. The image display device according to claim 1, wherein said first mirror oscillates about a first axis and said second mirror oscillates about a second axis.

25. The head mounted display device according to claim 13, wherein said first mirror oscillates about a first axis and said second mirror oscillates about a second axis.

* * * * *